(12) United States Patent
Mohr

(10) Patent No.: US 10,155,462 B2
(45) Date of Patent: Dec. 18, 2018

(54) VEHICLE SEAT PROTECTION COVER, METHOD FOR MANUFACTURING A VEHICLE SEAT PROTECTION COVER AND METHOD FOR USE OF A VEHICLE SEAT PROTECTION COVER

(71) Applicant: Horn & Bauer GmbH & Co. KG, Schwalmstadt (DE)

(72) Inventor: Thomas Mohr, Neustadt-Momberg (DE)

(73) Assignee: HORN & BAUER GMBH & CO. KG, Schwalmstadt (DE)

(*) Notice: Subject to any disclaimer, the term of this patent is extended or adjusted under 35 U.S.C. 154(b) by 43 days.

(21) Appl. No.: 15/604,930

(22) Filed: May 25, 2017

(65) Prior Publication Data

US 2017/0341550 A1 Nov. 30, 2017

(30) Foreign Application Priority Data

May 30, 2016 (EP) .................................. 16171980

(51) Int. Cl.
*A47D 15/00* (2006.01)
*B60N 2/60* (2006.01)
(Continued)

(52) U.S. Cl.
CPC ................. *B60N 2/60* (2013.01); *B32B 3/04* (2013.01); *B32B 5/022* (2013.01); *B32B 7/04* (2013.01);
(Continued)

(58) Field of Classification Search
CPC .......... B60N 2/58; B60N 2/6009; B60N 2/60; B60N 2002/905; A47C 31/11; A47C 7/021
(Continued)

(56) References Cited

U.S. PATENT DOCUMENTS 4,883,701 A * 11/1989 Rankin .................. A47C 31/11
428/136
5,275,463 A * 1/1994 Rocha .................... A47C 31/11
297/188.01
(Continued)

FOREIGN PATENT DOCUMENTS

DE 1 920 529 A 10/1970
DE 1 630 878 B 3/1972
(Continued)

OTHER PUBLICATIONS

Unpublished European Application No. EP 161554621, entitled "Vereinfachte Fahrzeugsitz-Schutzfolie und Verfahren zur Herstellung derselben", filed Feb. 12, 2016.
(Continued)

*Primary Examiner* — Shin H Kim
(74) *Attorney, Agent, or Firm* — Thomas | Horstemeyer, LLP

(57) ABSTRACT

The invention relates to a vehicle seat protection cover, which has been manufactured from a one-piece material sheet, which consists, e.g., of a fleece. The vehicle seat protection cover according to the invention has a front layer and a back layer, which limit an upper pocket and a lower pocket. The vehicle seat protection cover comprises an opening extending over its entire length. For one embodiment the vehicle seat protection cover is made of a nonwoven material or a fleece material.

31 Claims, 7 Drawing Sheets

(51) Int. Cl.
*B32B 3/04* (2006.01)
*B32B 5/02* (2006.01)
*B32B 7/04* (2006.01)
*B32B 27/30* (2006.01)
*B32B 37/14* (2006.01)
*B32B 38/00* (2006.01)
*B32B 38/04* (2006.01)

(52) U.S. Cl.
CPC .......... *B32B 27/306* (2013.01); *B32B 37/142* (2013.01); *B32B 38/0004* (2013.01); *B32B 38/04* (2013.01); *B60N 2/6018* (2013.01); *B60N 2/6072* (2013.01); *B32B 2038/042* (2013.01); *B32B 2250/24* (2013.01); *B32B 2262/0253* (2013.01); *B32B 2262/0261* (2013.01); *B32B 2262/0284* (2013.01); *B32B 2323/04* (2013.01); *B32B 2323/10* (2013.01); *B32B 2331/04* (2013.01); *B32B 2367/00* (2013.01); *B32B 2377/00* (2013.01); *B32B 2571/00* (2013.01); *B32B 2601/00* (2013.01); *B32B 2605/08* (2013.01)

(58) Field of Classification Search
USPC .......................................................... 297/229
See application file for complete search history.

(56) References Cited

U.S. PATENT DOCUMENTS

| | | | | |
|---|---|---|---|---|
| 5,806,925 | A | 9/1998 | Hanley | |
| 6,036,260 | A * | 3/2000 | Mullen | B60N 2/6036 2/69.5 |
| 6,048,026 | A * | 4/2000 | Barnett | A47C 31/11 297/229 |
| 6,481,793 | B1 | 11/2002 | Horn | |
| 7,537,284 | B1 | 5/2009 | Antorcha | |
| 7,677,661 | B1 * | 3/2010 | Ferrari-Cicero | B60N 2/2812 297/219.12 |
| 7,878,588 | B2 * | 2/2011 | Snedeker | A47C 31/11 297/218.1 |
| 2005/0130537 | A1 | 6/2005 | Phelps | |
| 2009/0322129 | A1 * | 12/2009 | Rodill | A47C 1/14 297/229 |
| 2010/0001565 | A1 * | 1/2010 | Gray | A47C 7/62 297/229 |
| 2015/0175043 | A1 * | 6/2015 | Tabbert | B60N 2/58 297/188.01 |
| 2018/0022258 | A1 * | 1/2018 | Matsushima | B60N 2/58 297/440.1 |

FOREIGN PATENT DOCUMENTS

| | | |
|---|---|---|
| DE | 41 32 714 C1 | 12/1992 |
| DE | 690 22 404 T2 | 5/1996 |
| DE | 297 05 666 U1 | 7/1997 |
| DE | 199 23 889 C2 | 10/2003 |
| EP | 2 913 224 B1 | 2/2014 |
| GB | 1 139 794 A | 1/1969 |
| JP | H08 38313 A | 2/1996 |
| WO | 2008-002684 A2 | 1/2008 |

OTHER PUBLICATIONS

Unpublished U.S. Appl. No. 15/428,559, entitled "Simplified Vehicle Seat Protection Film and Method for Producing the Same", filed Feb. 9, 2017.

* cited by examiner

VEHICLE SEAT PROTECTION COVER, METHOD FOR MANUFACTURING A VEHICLE SEAT PROTECTION COVER AND METHOD FOR USE OF A VEHICLE SEAT PROTECTION COVER

CROSS REFERENCE TO RELATED APPLICATIONS

This application claims priority to co-pending European Patent Application No. EP 16 171 980.2 filed May 30, 2016.

FIELD OF THE INVENTION

The invention relates to a vehicle seat protection cover. Such vehicle seat protection covers are put or pulled over vehicle seats to avoid a soiling of the vehicle seat, especially by assembly operators or mechanics, other persons or dirt in the environment. Vehicle seat protection covers are e.g. used in car repair workshops when an inspection or repair is done on vehicles. Furthermore, vehicle seat protection covers are used to avoid a soiling of the vehicle seat at the manufacturer of the vehicle seat and when supplying the vehicle seat to the car factory, where here, too, a handling of the vehicle seat can be done by a robot and a protection cover can protect contact surfaces between gripping or holding elements of the robot and the vehicle seat with respect to soiling and/or damages. Even during the mounting of the vehicle, a number of assembly operators or mechanics subsequently comes into contact with the vehicle seats. Finally, the completely mounted vehicle has to be driven off the assembly line, driven onto freight vehicles, trucks or railway carriages and finally handled several times again at the car dealer's business until the vehicle can be delivered into the hand of the buyer in a state that is as clean as possible. From the manufacture of the vehicle seat at the supplier's business until the delivery of the vehicle to the buyer, the vehicle seat possibly comes into contact with assembly operators or mechanics or other persons for 30 to 35 times so that there is a considerable danger of soiling, which is to be avoided by means of a vehicle seat protection cover.

The invention also relates to a method for manufacturing such a vehicle seat protection cover. Furthermore, the invention relates to a method for use of a vehicle seat protection cover.

BACKGROUND OF THE INVENTION

DE 199 23 889 C2 (corresponding to U.S. Pat. No. 6,481,793 B1) describes a vehicle seat protection cover made of double-layered plastic film, that is, a front layer and a back layer, according to DE 41 32 714 C1. In this vehicle seat protection cover, the two portions of the back layer forming pockets are connected by connection strips which extend over the free edges of the portions forming the pockets along transverse welds. The connection strips are also connected to the front layer, so that the back layer (that therefore is substantially continuous) comprises an opening with a closed boundary. The front layer and the back layer therefore comprise contours of the same size and are connected with each other continuously on all four edges, that is, in the region of the transverse welds as well as in the region of the longitudinal edges. The front layer is realized as continuously closed. In the back layer the opening with the closed edge is provided. On all sides the opening is arranged with a distance to the contour of the vehicle seat protection cover when lying flat. The opening constitutes the only opening by the aid of which the vehicle seat protection cover can be put over the backrest and the seat cushion. In addition to the two pockets known until now, by the connection strips additional transverse pockets connecting the pockets are produced. The transverse pockets reach behind the seat cushion and the backrest in transition regions and therefore pose an effective protection of these endangered parts of the vehicle seat against soiling. The danger of sliding in use of the vehicle seat which is protected by the vehicle seat protection cover is practically eliminated. Still, in the manufacture of this vehicle seat protection cover all manual work is avoided. An additional use of rubber bands, film strips and similar is also dispensed with and an additional mounting effort becomes unnecessary. In putting the vehicle seat protection cover over the vehicle seat, the vehicle seat protection cover rather automatically reaches its protection position enwrapping the seat cushion and the backrest. Via the transverse weld, the front layer is continuously connected to the back layer on every seat. On the other hand, the transverse welding can be produced in such a way that in this production step at the same time the separate vehicle seat protection covers are separated from each other so that they can be laid into a stack layered one above the other and in this way can also be shipped to a manufacturer of the vehicle seat, to a vehicle manufacturer or to a garage. Besides that, it is also possible to let the separate vehicle seat protection covers remain adhering to one another via perforations and to wrap such an infinity sheet onto a supply roll. An undesired loosening or dropping of the vehicle seat protection cover from the vehicle seat is to be avoided by using as a part separate from the vehicle seat protection cover a rubber band which after putting the vehicle seat protection cover over the vehicle seat is passed over the backrest as a closed loop in such a way that the rubber band is snug in the transition region between seat cushion and backrest. At the same time, the front layer of the seat cover in the transition region between seat cushion and backrest is fixed by the rubber band so that a danger of sliding is countered. Alternatively it is suggested that e.g. in the center portion of the free edge of the pocket which encloses the backrest two film strips are welded to the vehicle seat protection cover. The two film strips can then be slung to the front after the vehicle seat protection cover has been put over the vehicle seat and knotted with each other there. In this way a closer fit of the front layer of the seat cover can be guaranteed in the transition region between the seat cushion and the backrest.

According to DE 199 23 889 C2, a further known vehicle seat protection cover is at first manufactured as this is described in DE 1 630 878 B. After the parting of a plastic sheet into the separate vehicle seat protection covers, there is a welding of a semi-tube along the free edges of the pockets formed by the back layer and along the free edges of the front layer in the portion not covered by the pockets. During this welding of the semi-tube, a rubber band in the form of a loop is inserted. Then, with this rubber band an opening is made on the vehicle seat protection cover. The opening is used for putting the vehicle seat protection cover over the vehicle seat. The rubber band then exerts a certain tightening effect, so that especially the front layer of the vehicle seat protection cover is held closer to the seat cushion and the backrest. Due to the welding of the semi-tube with the rubber band (which is done by hand), such a vehicle seat protection cover is especially effort-consuming and expensive, but on the other hand has a good protective effect. Putting such a vehicle seat protection cover over a vehicle seat, however, is comparatively more difficult to be done than with the vehicle seat protection cover described before.

DE 199 23 889 C2 also describes it as known to sew a rubber band onto the edge of an opening of a seat cover made of a plastic film, said opening having a closed boundary. The sewing is done by hand and while fixing the rubber band with a pre-tension. This results in the rubber band as an elastic foreign object pulling together the inelastic film while forming folds. This is not only optically disrupting but also makes the winding onto a roll impossible. Even as individual items in the stack, such vehicle seat protection covers can only be handled with difficulty. Further disadvantages of this embodiment are a puckered fit on the vehicle seat, a liability of interference with electronic barriers and a danger of tearing and of propagation of tears of the film.

Finally, DE 199 23 889 C2 also describes as known a vehicle seat protection cover for vehicle seats according to DE 1 920 529 A which consists of an underyarn cloth that is elastically stretchable in all directions with a high elastic recovery and with high-pile wool or a similar material knitted into it in a stretched state of the elastic yarn cloth. Due to the high elasticity, such a vehicle seat protection cover is simple in handling and can be easily applied to the vehicle seat. The vehicle seat protection cover can be realized as a universal vehicle seat protection cover which can adapt to vehicle seats of different geometry. The vehicle seat protection cover in this case can consist of several parts or layers where in one of the layers an opening is provided to enable pulling the vehicle seat protection cover over the backrest as well as over the seat cushion.

On this background, DE 199 23 889 C2 suggests to manufacture at least the back layer of the vehicle seat protection cover wholly or partially from an elastic, resilient plastic film. The elasticity of the back layer is to be used to enable the removal and reinstallation of the vehicle seat protection cover, especially in connection with the mounting of the vehicle seat, to guarantee the reachability of mounting screws of the vehicle seat, for the installation of a drawer, a fire extinguisher and similar. Due to the elasticity, the vehicle seat protection cover can be manufactured slightly smaller in its dimensions than before. The elasticity still provides for a simple handling in putting the vehicle seat protection cover over the vehicle seat and an improved fit of the vehicle seat protection cover. Furthermore, the vehicle seat protection cover in the state put over the vehicle seat lies snug against to the contour of the vehicle seat. In this way, a possibility of interference disappears, for example when the correct position of the vehicle seat in the vehicle is measured and checked with electronic barriers. Overhanging parts of the film or folds of the vehicle seat protection cover can no longer lead to an interference. The vehicle seat protection cover can quickly and securely as well as fold-free be pulled on with a fit that is snug to the contours of the vehicle seat. Preferably, equipping the plastic film forming the back layer with an elastic elongation of 50% (preferably at least 60%) is suggested. As a material for the film material of the back layer a copolymer is used, especially made of ethylene vinyl acetate or butylene vinyl acetate, where other materials can also conform to the requirements, for example a thermoplastic elastomer or an especially elastic low-density material which may be used at least in layers or in blends or at 100%. It is additionally suggested that the elastic back layer can be equipped with a multi-layer film, where one layer of the multi-layer film is purposely equipped with good welding characteristics. It is furthermore suggested that the plastic film forming the front layer on the inner side turned towards the vehicle seat can be realized as anti-slip and on the outer side be realized as smooth and slick.

DE 297 05 666 U1 suggests a vehicle seat protection cover made of a fiber fleece which is said to have a pleasant textile surface characteristic, to form no pilling, to have a good fit to the respective form of the vehicle seat and to be able to be recycled after use if possible for the same use. In order to achieve this, the vehicle seat protection cover according to DE 297 05 666 U1 is manufactured of a fiber fleece the mass per unit area of which is smaller than 100 $g/m^2$. The fiber fleece, in order to achieve this, is cut to the shape of the vehicle seat protection cover. The vehicle seat protection cover formed in this way and which is generally in one part then fully covers the seat area, the seat edges and the backrest. To guarantee the continuous fit and the sticking on all sides of the vehicle seat protection cover, together with the tailored cut of the vehicle seat protection cover two holding elements are active. These are on the one hand a rubber band sewn to the seat fold or a textile band sewn to the gathered fiber fleece or a sewn tie with a one-sided loop as well as on the other hand a further mechanical connection between a holding flap sewn to the back seat part of the vehicle seat protection cover and the back part of the backrest of the vehicle seat protection cover. After use of this vehicle seat protection cover it is to be shredded coarsely. In a tearing machine, then torn fibers are manufactured which can be mixed back into a fiber fleece.

Further prior art which concerns protective covers for vehicle seats or child seats (that can be used for a long time, are comparatively massive and individually pre-formed and washable) is known from documents WO 2008/002684 A2, U.S. Pat. No. 7,537,284 B1, US 2005/130537 A1 and U.S. Pat. No. 5,806,925 A.

The patent document EP 2 913 224 B1 proposes a vehicle seat protection cover in which a back layer (at least partially) consists of a plastic film, while a front layer (at least partially) consists of a fleece. The back layer is realized as elastic. This realization is based on the idea to adapt the front layer on the one hand and the back layer on the other hand specially to their respective demands: The front layer formed with the fleece provides a pleasant contact surface for the user. The front layer is breathable in the region of the fleece, which on the one hand is advantageous for the wicking away of sweat and on the other hand for the wicking away of residual humidity evaporating from the vehicle seat. A significantly improved sound emission characteristic of the fleece at movements of the user on the vehicle seat can also be used. On the other hand, even with a non-transparent front layer made of a fleece, the back layer made of plastic can remain transparent so that the vehicle seat remains visible through the vehicle seat protection cover. Finally, the elasticity of the back layer can be used to guarantee a close fit of the vehicle seat protection cover, good mounting ability and demounting ability of the vehicle seat protection cover and possibly also an option for repeated use of the vehicle seat protection cover. In the fleece, fibers of polyethylene, PET, polyamide and/or polypropylene can be used. The plastic layer in the region of the back layer can be formed with one or multiple layers with manufacture of the plastic film with a laminating or co-extruding. EP 2 913 224 B1 proposes not to sew the front layer made of the fleece and the back layer made of the plastic film together, but rather to weld them together. In order to do this, the fleece can have concave bulges in the region of which the fleece is compacted. In thickened regions remote from these concave bulges the welding of the fleece to the plastic film can be done. For welding, a thermotransfer method, a heating wire or another heating element (possibly with a pressing of the heated surfaces to be welded under pressure) can be used.

In the non-prepublished European patent application with the official file number EP 16 155 462.1 (cp. the parallel non-prepublished corresponding U.S. Ser. No. 15/428,559), prior art according to the internet addresses http://www.slipngrip.com/SlipNGrip_Seat_Covers/FG-P9943-SC.html http://www.gammaplast.com/public/download/scheda_1_coprisedili_001.pdf is described which concerns vehicle seat protective films used as a kind of throw cover, which can in a simplified way be described as coat-like. These vehicle seat protection covers are formed with an upper tube part which is realised as closed in the circumferential direction and is closed in the upwards direction in the region of the upper edge, in which way the tube part forms an upper pocket that in cross section has closed edges. A lower tube part attaches directly to this upper tube part which on the back side comprises a slit that is continuous in a longitudinal direction and which is not closed in the upwards direction in the transition region to the upper tube part as well as in the downwards direction in the region of a lower edge. While opening the slit in the lower tube part, the vehicle seat protection cover can be thrown over a vehicle seat, where the upper pocket with the closed boundaries formed by the upper tube part can be pulled onto a headrest and the upper end portion of the backrest. The upper pocket here has to have a cross section which is at least as large as the cross section of the backrest in the upper end portion of the same. The opened lower tube part covers the lower part of the backrest as well as the seat area, where the lower tube part can overhang the seat cushion to the sides. To avoid a tearing of the vehicle seat protection cover in the transition region from the slit of the lower tube part to the upper tube part, the end portion of the slit of the lower tube part in the transition region to the upper tube part can be reinforced with a reinforcing film that is adhesively attached.

The patent application EP 16 155 462.1 on this background suggests a vehicle seat protection film which is manufactured of a plastic film with a thickness of less than 80 μm. An upper tube part which is not closed in the circumferential direction and which therefore has open boundaries, at most is used for pulling over a headrest of the vehicle seat, while the lower tube part equipped with a slit extends over the entire seat area formed by the seat cushion and the backrest and which is realised with a slit here. Preferably, no upper tube part is present at all so that the slit of the vehicle seat protection film is continuous to the closed upper edge of the vehicle seat protection film, especially a welding in the region of the upper edge. In this way, the complete upper pocket, too, is realised with an open boundary in cross section. Back layer parts separated from each other by the slit can be arranged as overlapping, in which way in the region of a weld seam in order to provide an upper edge three layers can be welded together. The vehicle seat protection film can consist of a one-piece plastic film which can also be realised as a multi-layer film. It is possible that the lateral extension of a front layer is smaller than the lateral extension of a backrest of a vehicle seat or even corresponds to approximately half the circumference of the headrest in the upper end portion of the headrest or is smaller than this. This embodiment is based on the finding that due to the slit of the back layer the cross section of the vehicle seat protection film can be opened so far that the vehicle seat protection film can be put over a backrest with a larger cross section (with a conical tapering in the direction of the upper edge at a sufficient distance from the upper edge). Such a vehicle seat protection film can therefore also be used for different vehicle seat types with different dimensions.

Further prior art is known from DE 690 22 404 T2 (corresponding to U.S. Pat. No. 6,048,026 A) and JP H08 38313 A.

SUMMARY OF THE INVENTION

The invention proposes a vehicle seat protection cover which comprises a front layer and a back layer. When the vehicle seat protection cover is put over a vehicle seat, the front layer is arranged on the front side of the vehicle seat, while the back layer is arranged on the back side of the vehicle seat. An upper pocket of the vehicle seat protection cover, which is intended for putting over the backrest of the vehicle seat, is limited by the front layer and the back layer. The upper pocket comprises an upper edge which is at least partially closed and preferably is closed over the entire transverse extension. According to the invention, the front layer and the back layer are manufactured together from a one-piece, folded material sheet. In this way, the vehicle seat protection cover can for example be generally realized according to a vehicle seat protection cover as has been described in the non-prepublished European patent application EP 16 155 462.1 of the applicant. Deviating from this embodiment, however, according to the invention the vehicle seat protection cover is also equipped with a lower pocket. The lower pocket is also limited by the front layer and the back layer. The lower pocket has a lower edge which partially, but preferably over the entire transverse extension, is closed.

By the use of a one-piece folded material sheet made possible according to the invention, the cost of manufacture and the effort for manufacture can be substantially reduced, because possibly the supplying and the connecting of several sheets of material can be foregone. Possibly, the range of the materials to be used when using a one-piece, folded material sheet can be broadened.

A further problem in the manufacture of the vehicle seat protection cover is posed by the connections between the front layer and the back layer, because the making of the connections is associated with an increased effort and the connections made can also be problematic with regard to the (long-term) stability of the vehicle seat protection cover. At least a part of the necessary connections between the front layer and the back layer can also be provided by the folds of the material sheet, because the material sheet can merge from the front layer via the fold into the back layer. Accordingly, in the region of the folds additional connections to be made separately (for example in the shape of a seam, a weld or an adhesive connection) are not necessary.

According to the invention, the back layer of the vehicle seat protection cover comprises an opening which is realized as continuous from the at least partially closed lower edge to the at least partially closed upper edge in the longitudinal direction (that is, without disruptions). By the aid of this opening, the back-side opening of the vehicle seat protection cover is possible so that the vehicle seat protection cover can be put over the vehicle seat. The opening of the back layer enables an upper pocket and/or a lower pocket to be formed (generally according to European patent application EP 16 155 462.1—however, there it is done only for the upper pocket). The edge-side cross section of it is given by the width of the at least partially closed edge, while the pocket can broaden away from the edge, in which way vehicle seats with different cross sections of the backrest and/or the seat cushion can enter differently far into the upper pocket or the lower pocket. In this way therefore an adaptability of the vehicle seat protection cover to vehicle seats of different types and geometries is guaranteed. Possibly, such a pocket "tapering" in the direction of the edge in such a way also constitutes a kind of "insertion aid" or "putting-over aid", which at first enables the insertion of the vehicle seat in a large cross section portion of the pocket and then at a further pulling-over of the pocket an increasingly tight fit of the pocket to the vehicle seat.

Preferably, the opening of the back layer that is continuous in the longitudinal direction is formed
by a gap between an overlap of the side portions in the region of the lower pocket,
a distance of the side portions in the region of the lower pocket,
an interruption of the back layer and/or
by a gap between an overlap of the side portions in the region of the upper pocket.

In one embodiment of the invention, a central portion of the material sheet forms the front layer. Side portions of the material sheet are folded in such a way that these (starting from different side edges of the front layer) together form the back layer which here comprises at least two-pieces. For forming the at least partially closed upper edge of the upper pocket, upper edges of the side portions of the material sheet are connected to the upper edge of the central portion of the material sheet via a connection or joint. Correspondingly, for forming the at least partially closed lower edge of the lower pocket, lower edges of the side portions of the material sheet are connected to the lower edge of the central portion of the material sheet via a connection or joint. The opening of the back layer then can be at least partially limited by side edges of the material sheet.

Generally, within the framework of the invention any joining technology can be employed for guaranteeing the closing of the upper edge and/or the lower edge. To mention only some non-limiting examples, a connection of the upper or lower edges of the side portions of the material sheet to the lower or upper edge of the central portion of the material sheet can be achieved via
a seam with a suitable seaming thread, for example made of polypropylene,
a direct gluing by a glue between the side portions and the central portion,
a gluing by means of a double-sided adhesive strip arranged between the side portion and the central portion or
a one-sided adhesive strip spanning the side portions and the central portion or similar.

For one embodiment of the invention, such a connection is achieved via a dotted or continuous weld seam which can extend over a part or the entire edge. Here, the weld seam can be achieved by the melting of an additional material independent of the material sheet (which can correspond to the material of the material sheet or be realized differently from this). Preferably, however, there is a direct welding of the side portions and the central portion of the material sheet with each other without an additional material.

The invention comprises embodiments in which several vehicle seat protection covers are manufactured in a continuous or discontinuous or intermitting manufacturing process and attached to one another in the region of the upper and lower edges. Here, it is possible that the weld seam is produced on the upper seam of the upper pocket of a vehicle seat protection cover with a certain distance from a neighboring weld seam of a lower edge of a neighboring vehicle seat protection cover and that a separation of the neighboring vehicle seat protection covers is done in the interspace between the two weld seams of the neighboring vehicle seat protection covers. This, however, necessitates making two separate weld seams with a defined distance.

According to a proposal according to the invention, the weld seam on the upper edge of the upper pocket of a vehicle seat protection cover and the weld seam of the lower edge of the lower pocket of the neighboring vehicle seat protection cover are provided by a common weld portion having a certain longitudinal extension which extends in neighboring edge portions of the two neighboring vehicle seat protection covers. If this weld portion is parted in the transverse direction in such a way that the two weld seams of the neighboring edges of the two vehicle seat protection covers remain, the two weld seams and the at least partial closure of the respective edges can be guaranteed with the production of a single weld portion, which constitutes a significant simplification of the manufacturing process. For this embodiment, on a vehicle seat protection cover a weld seam results which borders directly onto the upper edge of the upper pocket and a weld seam which borders directly onto the lower edge of the lower pocket. The same applies correspondingly for other joining technologies. For example, a connecting portion can be produced which after the parting in the transverse direction provides the connection of the two edges.

It is possible that the edges of the side portions of the material sheet have a straight contour, in which way the material sheet before the folding and the production of the connections of the upper and lower edge can be realized as rectangular. For one embodiment of the invention, the side edges of the side portions of the material sheet in a partial segment have a contour that is not straight, especially is concave. By the design of the contour of the side edges, the geometry of the vehicle seat and different functional portions of the vehicle seat protection cover can be purposely accommodated. It is possible that the material sheet is already provided as a semi-finished part with the contour of the side edges. Preferably, the providing of the semi-finished part, however, is done with a rectangular partial segment, while the material sheet with the not straight contour of the side edges is produced by a further processing process, especially by a cutting or punching.

Generally, any concave contour of the side edges of the material sheet is possible. For one vehicle seat protection cover according to the invention, the contour of the side edges of the material sheet has a gap contour. In the gap contour, the width of the material sheet is smaller than the lateral distance of the folds of the material sheet. This results in the front layer between the gap contours having a reduced transverse extension, in which way the front layer in this region possibly does not cover the full width of the vehicle seat. If the gap contours are arranged in the region of a vehicle seat protection cover which is to be inserted into a gap between the backrest and the seat cushion of the vehicle seat, the decreased lateral extension of the front layer between the gap contours is advantageous to enable the insertion of the front layer between side boundaries of the gap between the backrest and the seat cushion, for example boundaries by side hinges for tilting the backrest. For this embodiment according to the invention, the gap contour can separate an upper side strip of a side portion of the material sheet from a lower side strip of the side portion of the material sheet.

Within the framework of the invention, the mentioned side strips can comprise any longitudinal and transverse extension. For one embodiment of the invention, the upper side strip (aside from possible end-side straight or curved transition contours) has a constant lateral extension. It is possible that this lateral extension corresponds to the depth of the backrest, in which way the upper side strip can cover the backrest on the side. It is also possible, however, that the upper side strip has a larger lateral extension so that the upper side strip can also extend at least partially over the back side of the backrest.

Alternatively or cumulatively, the lower side strips can comprise different side strip portions: A first lower side strip portion can be present which extends upwards from the lower edge of the lower pocket. Furthermore, a second lower side strip portion can be present which follows the first lower side strip portion in the upward direction. The second lower side strip portion comprises a smaller lateral extension than the first lower side strip portion. The first lower side strip portion can be intended to cover the front side of the seat cushion. In order to do so, the first lower side strip portion can comprise an extension in the longitudinal direction which corresponds to the height of the seat cushion or is larger than this height. On the contrary, the second lower side strip portion can be intended to cover the side areas of the seat cushion. In order to do so, the second lower side strip portion can have a lateral extension that corresponds to the height of the seat cushion or is larger than this height.

The side portions of the material sheet extending from the opposing side edges may comprise at least one overlap. To mention only some non-limiting examples, the side portions of the material sheets can overlap in the region of the lower side strip portions, in which way the front side of the seat cushion can be completely covered by the vehicle seat protection cover due to the overlap. On the contrary, non-overlapping partial portions of the side portions of the material sheet can be used to open the pockets and to enable the initial putting over the vehicle seat in these portions. On the other hand, by the overlaps the adaptability of the vehicle seat protection cover to vehicle seats of different types and geometries can be guaranteed, because with the opening of the pockets by the adaption of the amount of the overlap in the lateral direction the opening cross section of the pockets can be changed but at the same time, with the part of the overlap remaining, it can be guaranteed that the front side of the seat cushion of the vehicle seat is completely covered. This is true correspondingly for a possible overlap in the region of the upper pocket.

If the overlap also extends in the region of the upper and/or the lower edge, the overlap can also be used for a better connection of the front layer to the back layer. If, e.g., a material sheet is used the welding of which necessitates a certain thickness of the material sheet, the overlap of the side portions of the material sheet leads to both side portions of the material sheet having to be welded with the front layer so that in this region the triple thickness of the material sheet can be used for the welding, in which way a welding is enabled in the first place, or can be improved by the availability of more material.

Generally, in the vehicle seat protection cover the material sheet can comprise any geometry with any openings, projections, edges, additional material sheets, coatings, further applied layers (for example by lamination, coextrusion, adhesion) and similar. For a special proposal according to the invention, the material sheet comprises an opening which forms a viewing window of the vehicle seat protection cover. This embodiment is based on the fact that with a generally non-transparent realization of the vehicle seat protection cover the vehicle seat protected with the vehicle seat protection cover is no longer visible through the vehicle seat protection cover. If, however, different vehicle seats are stored or mounted with a vehicle, knowing the respective type of the vehicle seat protected by the vehicle seat protection cover or its color is of interest. By the viewing window, the vehicle seat can still remain visible through the vehicle seat protection cover. It is possible that the viewing window is an aperture. If a soiling or a damage to the vehicle seat through the viewing window is to be avoided, the opening forming the viewing window can be closed by means of an additional material, for example a transparent plastic film glued to the vehicle seat protection cover.

It is also possible that an opening in the material sheet constitutes an eyelet by means of which for example a tie, a thread, a hook or similar can be connected which serves for fixing and/or tightening of the vehicle seat protection cover on the vehicle seat.

It is possible that the vehicle seat protection cover can also comprise suitable openings through which supporting elements for a headrest or a belt buckle or a belt can extend. Such openings can already be cut out or punched out or be perforated so that they are only made in use of the vehicle seat protection cover or when necessary.

For one vehicle seat protection cover according to the invention, an additional layer has been applied at least to a partial portion of the material sheet. This additional layer can serve the following alternative or cumulative aims mentioned as examples:

- By means of such an additional layer, a transparent closing of an opening for a viewing window can be achieved.
- By means of an additional layer, a strengthening of the material sheets in an especially strongly stressed portion can be achieved.
- If the additional layer is on the side of the vehicle seat protection cover turned towards the vehicle seat, by means of the additional layer the non-slip characteristics of the vehicle seat protection cover with respect to the vehicle seat can be increased.
- If the additional layer is on the side of the vehicle seat protection cover turned towards the user, the additional layer can guarantee an easy sliding of the user at movements on the vehicle seat protection cover and/or guarantee a pleasant contact, possibly also with an absorption and/or a wicking-away of sweat, with the user.
- It is possible that in the region of the additional layer a marking of the vehicle seat protection cover is done (for example with an indication of type, notes for use of the vehicle seat protection cover, indications of types of vehicle seats for which the vehicle seat protection cover is intended, notes for a disposal of the vehicle seat protection cover or indications of a manufacturer of the vehicle seat protection cover).
- It is also possible that by means of the additional layer a securing of the vehicle seat protection cover in the position mounted on the vehicle seat is guaranteed by partial portions being able to be fixed to another partial portion of the vehicle seat protection cover via the additional layer, for example after a tightening of partial portions of the vehicle seat protection cover.
- The additional layer can serve for interrupting or shortening the opening being continuous in the longitudinal direction between the upper edge and the lower edge.

The additional layer can be used for adapting the vehicle seat protection cover to different types of vehicle seats. For example, via the additional layer a gathered geometry of the vehicle seat protection cover can be fixed or secured.

It is possible that the additional layer consists of a material which is breathable anyway. It is also possible that the additional layer is equipped with openings of any form, size and arrangement by which a breathability can be guaranteed. If the additional layer is a plastic film or a non-woven material or a fleece, the purposeful production of openings for a breathability can be achieved by a needling of the additional layer.

The additional layer can already have been applied to the semi-finished part or the material sheet before the folding of the material sheet. It is also possible, however, that the additional layer is only applied after the folding of the material sheet and/or the production of the connections in the region of the edges.

Joining the additional layer to the material sheet can be done in any way, especially by a coating or by gluing of the additional layer, by laminating or (co-)extruding. For one embodiment, the additional layer is a plastic film which may comprise one or more layers and/or may be adhesive on one or both sides.

For the case that an additional layer has been applied to a partial region of the material sheet, according to one embodiment this is not done in the region of the front layer, since then the breathability of the vehicle seat protection cover is not reduced in the contact region to the user by the additional layer. For example, the additional layer can have been applied in the region of the side portions of the material sheet which enters into interaction with a side surface of the seat cushion or the backrest, enters into interaction with the front or lower side of the seat cushion or enters into interaction with the upper side of the backrest or the back side of the backrest.

It is possible that the additional layer is applied onto the material sheet via two pressure rollers in the ongoing conveying process, where preferably an alignment of a longitudinal axis of an additional layer is done corresponding to the conveying direction of the material sheet. Preferably, an additional layer is also arranged in the region of the connections of the upper and/or lower edge so that the connection (especially the weld seam) can also be used for fixing the additional layer to the material sheet.

The continuous opening of the back layer between the upper edge and the lower edge can comprise a slit, so that side edges of the material sheet in the region of the slit directly neighbor each other. As mentioned, the side portions of the material sheet in the region of the back layer can also comprise at least one overlap. Especially when using the concave contours of the side edges of the material sheet, however, the back layer can comprise an opening which may be a (put in a simplified way) U-shaped opening in the region of the seat cushion. By the U-shaped opening, the lateral extension of which can also change with the spreading of the lower pocket, the supporting structure of the seat cushion extends with respect to the floor of the passenger cell. It is also possible that the opening of the back layer extends in an insertion region of the front layer and/or in the back portion of the back layer, in which for the vehicle seat protection cover having been put over the vehicle seat the transition from the backrest to the seat cushion occurs.

Generally, in the vehicle seat protection cover according to the invention, a material sheet of any material can be used. It is for example possible that for the material sheet a plastic film is used which especially has been modified with regard to its breathability. This can for example be achieved by inserting openings, punches, breathing holes by needling. The breathability of the plastic film can also have been increased by the addition of fillers with a stretching. For example, to the plastic material chalk particles may have been added from which then micro-holes form. However, the use of any textile material for the material sheet is also possible.

According to one proposition of the invention, for the material sheet a non-woven material or a fleece is used. Without this necessarily having to be the case, preferably the vehicle seat protection cover is only manufactured from the non-woven material or the fleece with the mentioned connections, especially by a weld seam. Therefore, for the vehicle seat protection cover the advantageous characteristics of a non-woven material or a fleece (especially a good breathability, a pleasant interaction with the user and a much decreased sound emission at movement) can be used for the vehicle seat protection cover.

It is possible that a non-woven material or a fleece of any known kind is used. Preferably, the fleece is formed from fibers. For example, fibers of polyethylene, PET, polyamide and/or polypropylene can be used. Fibers of the non-woven material or fleece can be used that have been manufactured out of fine monofilaments with diameters up to 1.4 μm which have been stretched and then cut, then are stacked one upon the other in a plane and subsequently are calendered with a calender with nails under application of heat. It is also possible that a material is used which has been manufactured in a spun-bond process or a material which has been manufactured in a water-jet process.

For the material sheet made of the non-woven material or fleece, a material sheet with any mass per unit area and any thickness and density can be used. In a vehicle seat protection cover according to the invention, the material sheet made of the non-woven material or fleece has a mass per unit area in the region of 12 $g/m^2$ to 60 $g/m^2$ (especially 20 $g/m^2$ to 55 $g/m^2$ and preferably 35 $g/m^2$ to 45 $g/m^2$). Experience has shown that for a material sheet with such a mass per unit area a vehicle seat protection cover can be provided which is comparatively light, has a small volume in its sold state and due to the low use of material is comparatively cheap, but which still guarantees a sufficient operational stability, a sufficient protection of the vehicle seat and the possibility of joining by welding, while at the same time guaranteeing sufficient breathability.

Generally, a material sheet with any air permeability can be used. For one embodiment, the material sheet has an air permeability which is at least 2,000 mm/s (especially at least 2,000 mm/s for a mass per unit area of the fleece of 40 $g/m^2$ or at least 2,500 mm/s for a mass per unit area of the fleece of 30 $g/m^2$) according to standard DIN EN ISO 9237 in the version current at the application date.

Conventional vehicle seat protection covers can have been manufactured from a tube, in which way the conditions to the used methods of manufacture and/or the used semi-finished parts are limited. Furthermore, for known vehicle seat protection covers possibly connections or weld seams in the upper and side edge regions between the front layer and the back layer have to be made which can have an overall length of more than 4 m. According to the invention, the length of the connections to be made can on the one hand be reduced by the transition from the front layer to the back layer being partially guaranteed by the folds of the material sheet. On the other hand, the realization of the pockets with open edges in the cross section leads to the vehicle seat protection cover being able to have a generally smaller lateral extension. However, due to the opening of the pockets via the side openings the vehicle seat protection cover is still able to be used for vehicle seats with comparably large dimensions. This results in the connections or weld seams to be established in the region of the upper edge and the lower edge being able to have a comparatively small length. For a special proposition of the invention, the overall length of the connections of the vehicle seat protection cover to be established, especially the weld seams to be established, between the front layer and the back layer on a vehicle seat protection cover overall is smaller than 1,400 mm (especially smaller than 1,200 mm or 1,100 mm).

Generally, material sheets of any lateral extension can be used within the framework of the invention. For one embodiment, a material sheet is used the maximum lateral extension of which is not larger than 1,600 mm, in which way the spatial effort for the storage of the material sheet and the transverse extension of the conveyor belt for the material sheet, and possibly also the cost for the provision of the semi-finished part of the material sheet, can be reduced.

To mention only a non-limiting example, at the use of a non-woven material or a fleece, a semi-finished part can be commercially bought which is offered on rolls with widths of 3,200 mm and 1,600 mm. For the use according to the invention of a material sheet with a maximum lateral extension not larger than 1,600 mm, according to the invention, for the first time a vehicle seat protection cover can be manufactured from a material sheet of a non-woven material or fleece with a correspondingly smaller roll with decreased lateral extension.

The material sheet may also be realized as antistatic. The antistatic realization of the material sheet can for example mean that the material sheet has a surface resistance which is smaller than $10^{10}$ ohm, especially smaller than $10^8$ ohm or even smaller than $10^3$ ohm or $10^1$ ohm. The induction of such antistatic characteristics of the material sheet can be achieved in multiple ways.

For example, antistatic agents can be mixed into the material sheet, for example to a polymer of the fibers of the fleece.

An infusion method and/or an impregnation method for a manufactured fleece or a non-woven material for the improvement of the antistatic characteristics is also possible.

The use of conductive materials such as carbon fibers or the introduction of carbon black particles is also possible.

It is also possible that metallized plastics are used or added for an improvement of the antistatic characteristics.

It is possible, for example, that a weld seam is made by ultrasound welding, in which an introduction of heat into the material sheet for the partial melting of the same is achieved via ultrasound and then a pressing of the portions of the material sheet to be welded with each other is done. It is also possible that as the material sheet or the additional layer a fleece is used which is sold under the name of "TYVEK" (registered trademark of the firm of DuPont de Nemours (Deutschland) GmbH).

A further solution of the object of the invention is a method for manufacturing a vehicle seat protection cover of the kind explained before. In this method, at first a sheet-shaped semi-finished part is provided. From the sheet-shaped semi-finished part then by a cut or a punching a material sheet is produced the side edges of which have a concave contour. The side portions of the material sheet are then folded in such a way that they form the back layer, while a central portion of the material sheet forms the front layer. Upper edges of the side portions of the material sheet are connected to the upper edge of the central portion of the material sheet. In this way, the at least partially closed upper edge of the upper pocket is produced. Furthermore, lower edges of the side portions of the material sheet are connected to the lower edge of the central portion of the material sheet. In this way, the at least partially closed lower edge of the lower pocket is produced. Preferably, the connecting is here done by welding. During the provision of an elongated semi-finished part (for example from a roll) for several vehicle seat protection covers manufactured lying one behind the other the mentioned upper and lower edges of the vehicle seat protection cover are only formed after a separation of the neighboring vehicle seat protection covers.

In the method explained before, the connections in the region of the upper edge and the lower edge (especially the weld seams) can be established separately and simultaneously or subsequently. For one proposition of the invention, in the method for manufacturing the vehicle seat protection cover at first a connecting portion between the side regions of the material sheet and the central portion is established, in which context the connecting region has a certain longitudinal extension. For one embodiment, the connecting portion is a welding portion. Subsequent to this, by separation or perforation the connecting portion is parted into a connection or weld seam which on the first vehicle seat protection cover connects the lower edges of the side portions of the material sheet to the lower edge of the central portion and a connection or weld seam which on the second neighboring vehicle seat protection cover connects the upper edges of the side portions of the material sheet to the upper edge of the central portion. In this way, the manufacturing effort for the establishment of the two connections or weld seams can be significantly reduced.

A further solution of the object of the invention is given by a method for the use of a vehicle seat protection cover of the kind explained before. For the use of the vehicle seat protection cover, the upper pocket of the vehicle seat protection cover is pulled over a backrest of the vehicle seat, while the lower pocket of the vehicle seat protection cover is pulled over a seat cushion of the vehicle seat. Generally, the sequence of this pulling-over over the backrest and the seat cushion is arbitrary while a pulling-over over the seat cushion after the pulling-over over the backrest is preferred.

For a further embodiment of the invention, in the use of the vehicle seat protection cover an insertion region of the vehicle seat protection cover is inserted into a gap between the backrest of the vehicle seat and a seat cushion of the vehicle seat.

In this context, for a further embodiment of the method according to the invention, the insertion region of the vehicle seat protection cover can be secured in the gap between the backrest of the vehicle seat and a seat cushion of the vehicle seat. For the way of securing there are multiple possibilities, for which in a non-limiting way the following (alternative or cumulative) possibilities are mentioned:

It is possible that the insertion region of the vehicle seat protection cover in the contact region with the backrest and the seat cushion in the region of the gap is equipped with an additional layer impeding shifting.

It is possible that the insertion region is secured in the gap by a thread or a tie (elastic or non-elastic) that passes through the gap in the lateral direction on the side of the insertion portion turned away from the vehicle seat and under tautening or tensioning is knotted or fixed in another way on the back of the vehicle seat. A rubber band can also be put over the vehicle seat and the vehicle seat protection cover, which then pulls the vehicle seat protection cover with the insertion region into the gap and secures it there.

It is possible that for the case that the gap between the backrest of the vehicle seat and the seat cushion of the vehicle seat is realized as continuous to the back of the vehicle seat, the insertion region of the vehicle seat protection cover passes through to the back side of the vehicle seat, where the insertion region then may be connected to the back layer of the vehicle seat protection cover (for example glued to an additional two-sided adhesive layer that has been glued to the back layer).

It is also possible especially for a gap that does not continue through in the direction of the back of the vehicle seat that after the insertion of the insertion region into the gap a securing rod, especially a plastic tube, with a lateral alignment of the longitudinal axis of the securing rod is inserted into the gap in such a way that the emergence of the securing rod is hindered due to a tapering of the gap between the backrest and the seat cushion.

Instead of the securing rod, an inflated plastic tube or hose or an expanded or foamed plastic tube or hose, for example made of polyethylene or polypropylene, can be used which then can be emptied for a disposal so that is does not have a large volume. Preferably, the plastic tube consists of the same material as the fleece or the non-woven material of which the material sheet consists or of the same material as the additional layer.

Generally, any other possibility of securing, especially a securing by use of cable ties or similar is possible, however.

If a good fixing of the vehicle seat protection cover on the vehicle seat is to be achieved, alternatively or cumulatively a hindering of shifting can be achieved by a suitable design of the contact surfaces of the vehicle seat protection cover, especially with a suitable additional layer, and a mechanical fixing, for example by the aforementioned securing measures of the insertion portion and/or further tightening or securing mechanical measures.

It is also possible that the vehicle seat protection cover also covers a headrest. It is furthermore possible that by means of an additional layer, for example by means of an applied plastic film, the opening principally extending between the upper edge and the lower edge is partially closed or fixed in the region of the upper pocket or in the region of the lower pocket so that in the region of this additional layer the extension of the pocket is set and cannot be changed by opening the opening.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

In the following description, a front side of the vehicle seat designates the side of the vehicle seat turned towards the person sitting on it. On the contrary, the back side of the vehicle seat designates the side of the vehicle seat turned away from the person sitting on the vehicle seat. "Up" and "down", "top" and "bottom" or "upper" and "lower" designate the corresponding spatial positions in the figures, where "up", "top" and "upper" (or "down", "bottom" or "lower") also correlates with a position in the direction of the upper end portion of the vehicle seat in the region of the backrest or headrest (or a position in the direction of the front end portion of the vehicle seat in the direction of driving) when the vehicle seat protection cover has been put on the vehicle seat. A longitudinal axis or longitudinal direction in the figures designates a longitudinal and symmetry axis of the material sheet and the vehicle seat protection cover which for the vehicle seat protection cover having been put on the vehicle seat correlates with the longitudinal axis of the seat cushion of the vehicle seat and the vertical axis or longitudinal axis of the backrest. On the contrary, a lateral direction or transverse direction in the figures designates a horizontal direction which for the vehicle seat protection cover having been put on the vehicle seat correlates with a vehicle transverse axis.

Figure 1:
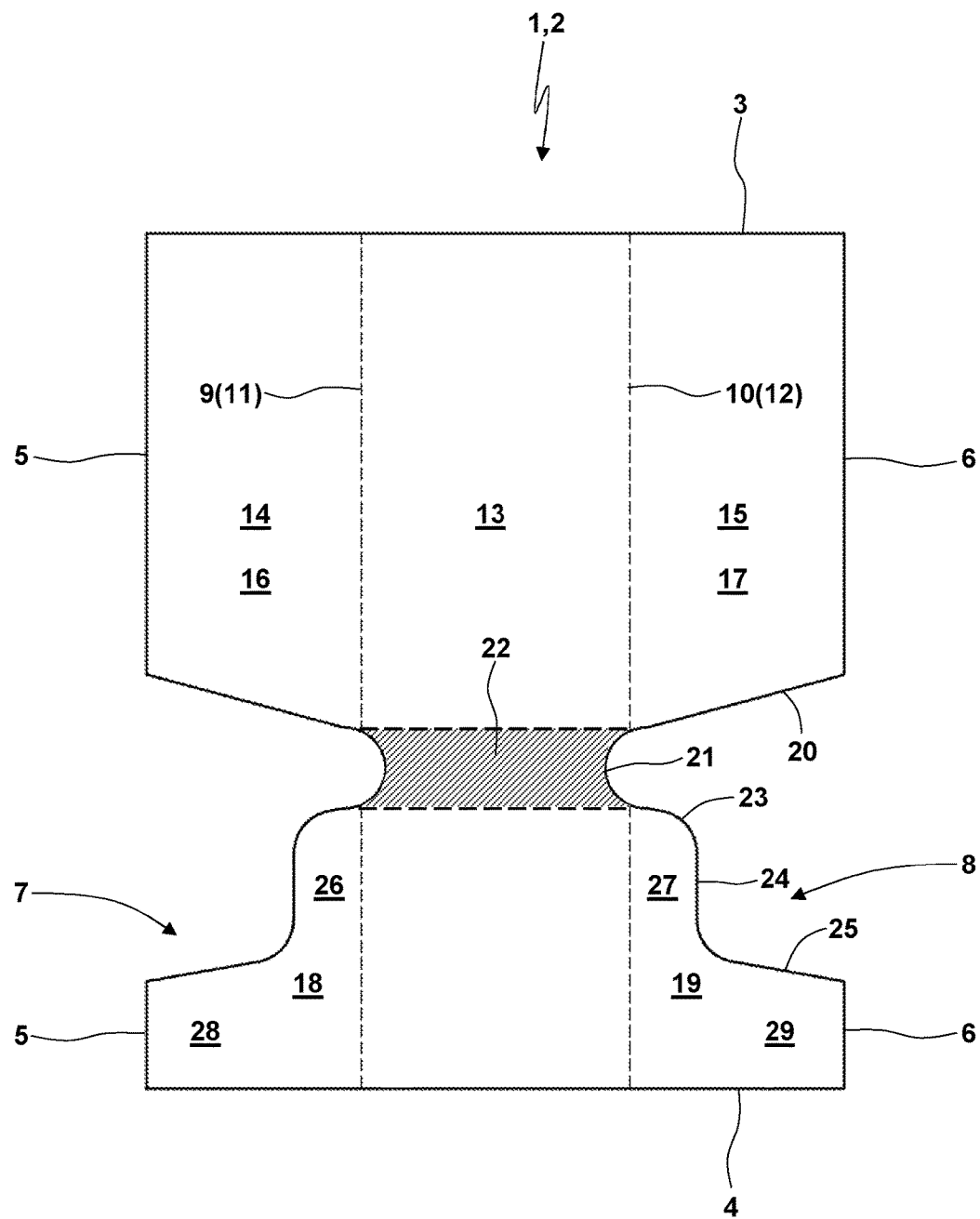
FIG. 1 shows a material sheet for a vehicle seat protection cover.

FIG. 1 shows a material sheet 1 of a vehicle seat protection cover 2. The materials sheet 1 in FIG. 1 is shown in a flat, plane state. The material sheet 1 in the view from above comprises a generally rectangular outer contour with an upper edge 3 and a lower edge 4 which are straight and oriented in the transverse direction and side edges 5, 6 which are oriented in the longitudinal direction and (apart from concave contours 7, 8) are also realized as straight. The concave contours 7, 8 preferably have been produced by a cutting or a punching from a segment of a semi-finished part with a rectangular cross section.

Marked in dashed lines in FIG. 1 are fold lines 9, 10 for folds 11, 12. The fold lines 9, 10 extend in parallel to each other and parallel to the straight partial regions of the edges 5, 6 in the longitudinal direction. The fold lines 9, 10 separate a central (with regard to the lateral extension) portion 13 from side portions 14, 15.

By the concave contours 7, 8, the side portions 14, 15 are each separated into upper side strips 16, 17 and lower side strips 18, 19. The concave contours 7, 8 are in each case realized as identical but mirror-symmetric to the longitudinal axis. The concave contours 7, 8 each have a transition contour 20 with which the upper side strips 16, 17 from the respective straight part of the edge 5, 6 merge into the corresponding fold line 9, 10. For the embodiment shown, the transition contour 20 is straight. A recess contour 21 abuts the transition contour 20 in the downward direction. Due to the recess contour 21, the lateral extension of the central portion 13 in an insertion portion 22, which is shown hatched in FIG. 1, is smaller than the distance of the fold line 9, 10. For the embodiment shown, the recess contour 21 is realized as half-circular, curved or part-circular. In the downward direction, a transition contour 23 which here is formed as a curve without a kink abuts the recess contour 21. Via the transition contour 23, the contours 7, 8 merge into a first edge contour 24, which here is straight and parallel to the fold lines 9, 10. Via a further transition contour 25, the straight part of the edge 6, which extends to the lower edge 4, abuts the first edge contour 24.

The lower side strips 18, 19 are each formed with
a first lower side strip portion 26, 27 which in the upwards direction are limited by the transition contour 23 and laterally outwards are limited by the first edge contour 24 and
a second lower side strip portion 28, 29 which in the upwards direction is limited by the first lower side strip portion 26, 27 and the transition contour 25, are limited in the downwards direction by the lower edge 4 and in the laterally outwards direction are limited by a straight part of the edge 5, 6 which extends to the edge 4.

The dimensions of the material sheet 1 can be chosen arbitrarily. Preferably, the material sheet 1 has the following dimensions:

The longitudinal extension of the material sheet 1 is preferably smaller than 2,000 mm, especially in the region from 1,400 mm to 2,000 mm or 1,400 mm to 1,800 mm.

The distance of the fold lines 9, 10 preferably is less than 700 mm, for example in the region of 450 mm to 700 mm or 500 mm to 600 mm.

The lateral extensions of the upper side strips 16, 17, the first lower side strip portions 26, 27 and the second lower side strip portions 28, 29 can be taken from the figures corresponding to the relative dimensions, where deviations of ±20%, ±10% or ±5% from the shown relative dimensions are possible for these lateral extensions.

The insertion portion 22 has a longitudinal extension of 150 mm to 400 mm, preferably 180 to 300 mm. The maximum transverse extension of the insertion portion 22 for example is between 300 mm and 650 mm, preferably between 350 mm and 500 mm.

The same is true correspondingly for the longitudinal extensions of the upper side strips 16, 17, the lower side strips 18, 19, the first lower side strip portions 26, 27 and the second lower side strip portions 28, 29.

Only one, several or all of the aforementioned dimensions can be realized in a material sheet 1. The concave contours 7, 8 can have any other contour than shown in FIG. 1.

Figure 2:
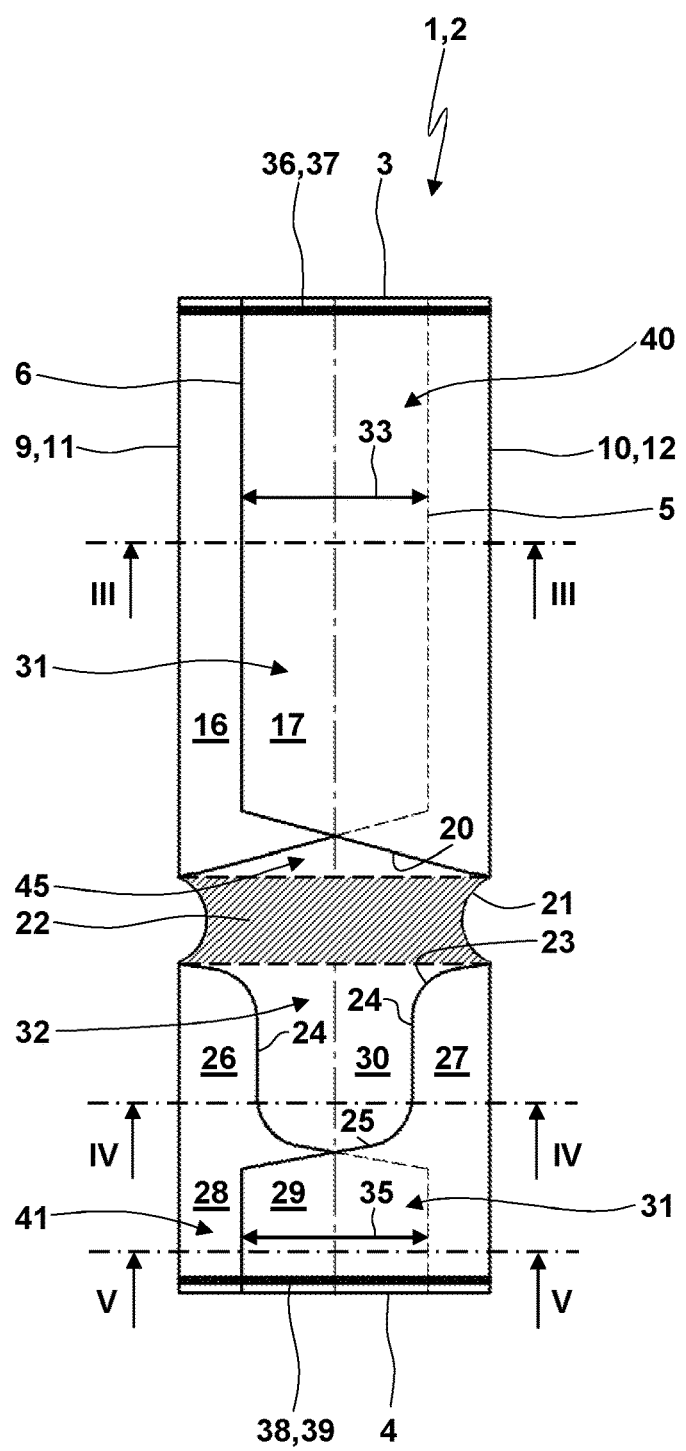
FIG. 2 shows a back view of a vehicle seat protection cover manufactured from a material sheet according to FIG. 1.
Figure 3:
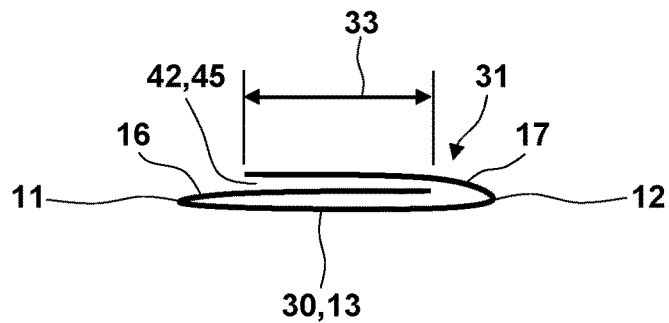
FIG. 3 shows a cross section III-III of the vehicle seat protection cover according to FIG. 2.

The material sheet 1 is folded into the vehicle seat protection cover 2 according to FIG. 2 along the fold lines 9, 10. FIG. 2 shows a view from the top onto the back side of the vehicle seat protection cover 2. The central portion 13 then forms a front layer 30 of the vehicle seat protection cover 2, which here is covered by the back layer 31 (apart from the region of an opening 32 of the back layer 31). The lateral dimensions of the upper side strips 16, 17 are chosen such that due to the folds 11, 12, an overlap 33 forms, the lateral extension of which for the embodiment shown is more than half the lateral distance of the fold lines 9, 10 (cp. the cross section III-III in FIG. 3).

Figure 4:
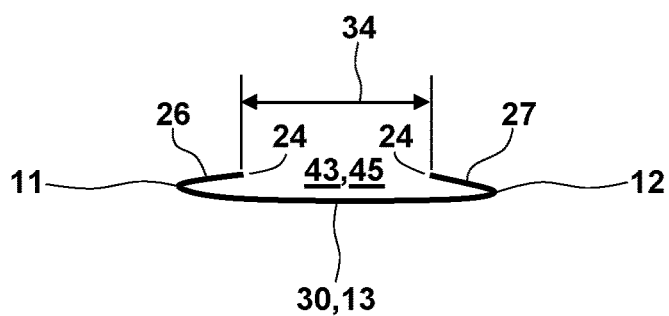
FIG. 4 shows a cross section IV-IV of the vehicle seat protection cover according to FIG. 2.

On the contrary, the first lower side strip portions 26, 27 do not form an overlap (cp. the cross section IV-IV according to FIG. 4). Rather than that, the first edge contours 24 here have a distance 34, which for the embodiment shown comprises approximately half the distance of the fold lines 9, 10.

Figure 5:
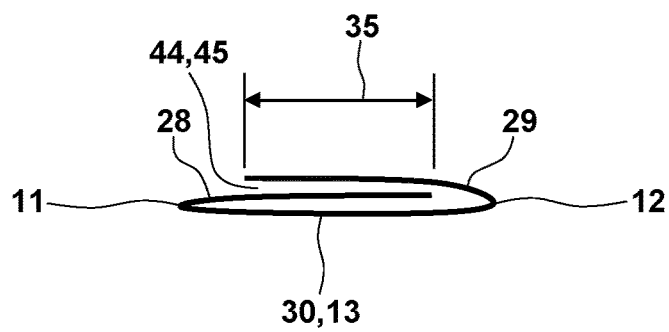
FIG. 5 shows a cross section V-V of the vehicle seat protection cover according to FIG. 2.

In the region of the second lower side strip portions 28, 29 these have an overlap 35 which can correspond to the overlap 33 (cp. the cross section V-V according to FIG. 5).

The opening 32 of the back layer in the longitudinal direction is limited in the upwards direction by the transition contours 25 and in the downwards direction by the transition contours 23, the first edge contours 24 and the transition contour 25, as can be seen especially in FIG. 2. In the region of the insertion portion 22 of the front layer 30, that is, between the recess contours 21, the opening 32 of the back layer 31 extends over the full transverse extension of the latter.

In the region of the upper edge 3, the back layer 31 formed by the two overlapping upper side strips 16, 17 is connected to the front layer formed by the central portion 13 via a connection 36, which here is a weld seam 37. For the embodiment shown, the weld seam 37 extends over the entire upper edge 3. In the region of the overlap 33 there occurs the joining, especially the welding, of three layers (that is, the overlapping side strips 16, 17 and the front layer 30) while laterally outside the overlap 33 only two layers (one of the side strips 16, 17 and the front layer 30) are welded with each other.

Correspondingly, on the lower edge 4 the front layer 30 formed with the central portion 13 is connected to the back layer 31 which here is formed by the second lower side strip portions 28, 29 via a connection 38, which here is a weld seam 39. Here, too, the connection 38, especially the weld seam 39, extends over the entire lower edge 4, and in the region of the overlap 35 three layers are connected with each other, while laterally outside the overlap 35 only two layers are connected with each other.

The front layer 30 formed by the central portion 13 together with the upper side strips 16, 17 forms an upper pocket 40 which due to the connection 36 or weld seam 37 is closed in the upwards direction and due to the opening 32 is open in the downwards direction. Furthermore, the front layer 30 forms a lower pocket 41 with the lower side strips 18, 19. Due to the connection 38 or weld seam 39, the lower pocket 41 is closed in the downward direction, while due to the opening 32 it is open in the upwards direction. The upper pocket 40 as well as the lower pocket 41 in their cross sections do not have closed boundaries but rather have open boundaries. The edge opening of the upper pocket 40 is formed by a gap 42 formed between the overlaps 33. The lower pocket 41, too, is realized with open boundaries. The edge opening of the lower pocket 41 in the region of the first lower side strip portions 26, 27 is formed with a gap 43 between the first edge contours 24 corresponding to the distance 34, while the edge opening of the lower pocket 41 in the region of the second lower side strip portions 28, 29 is formed by a gap 44 of the side strip portions 28, 29 in the region of the overlap 35. Therefore, between the connections 36, 38 or weld seams 37, 39 the vehicle seat protection cover 2 in the region of the back layer 31 over the entire longitudinal extension is not formed with closed boundaries. Rather than that, over the entire length between the connections 36, 38 a continuous opening 35 extends which is formed by the gap 42, the opening 32, the gap 43 or a distance 34 and the gap 44, which without interruptions merge into one another and which form the continuous edge opening of the back layer 31.

A use of the vehicle seat protection cover according to FIGS. 1 to 5 is done as follows:

A backrest of a vehicle seat from the opening 32 is inserted into the upper pocket 40 from below. The upper pocket can be opened in the lower end portion by decreasing the overlap 33 in the lower end portion and pulling apart the upper side strips 16, 17. Because, however, the overlap 33 of the upper side strips 16, 17 in the region of the connection 36 is fixed, in spite of the opening of the lower end portion of the upper pocket 40, the cross section of the upper pocket 40 preferably decreases continually upwards. The backrest can then be inserted into the upper pocket 40 until the tapering upper pocket 40 closely encloses the upper end portion of the backrest. It is possible that in a portion of the upper pocket 40 which protrudes upwardly a headrest of the vehicle seat is accommodated. Preferably, the lateral extension of the upper edge 3 is larger than half the circumference of the headrest but smaller than half the circumference of the backrest in the upper end portion of the latter.

Subsequently, the lower pocket can be put over the seat cushion of the vehicle seat. In order to do this, the lower pocket can be opened in the end portion turned away from the lower edge 4, in which way the distance 34 is increased and the overlap 35 away from the connection 38 can be decreased. Due to the fixing of the overlap 35 in the region of the connection 38, the lower pocket 41 tapers in the direction of the lower edge 4.

It is possible that the upper pocket 40 completely or in an upper partial portion completely enwraps the backrest. On the contrary, the lower pocket 41 in the region of the side strip portions 26, 27 enwraps the side areas of the seat cushion, while the lower pocket 41 in the region of the side strip portions 28, 29 protects the front side of the vehicle seat and possibly also an underside of the vehicle seat.

In a state of the vehicle seat protection cover 2 pulled onto the vehicle seat like this, the insertion portion 22 can be inserted into a gap between the backrest and the seat cushion of the vehicle seat, in which way an additional securing of the insertion portion 22 in the gap can be achieved with the securing measures as mentioned in the beginning. Since in this way the material of the seat cushion and the backrest is also protected by the insertion portion 22 in the region of the gap, for a handling of the vehicle seat protected with the vehicle seat protection cover 2, a holding or gripping element of a robot can be inserted into this gap. The recess contours 21 are dimensioned in such a way that the insertion portion 22 is brought about at side limitations of the gap, especially in the region of hinges.

Figure 6:
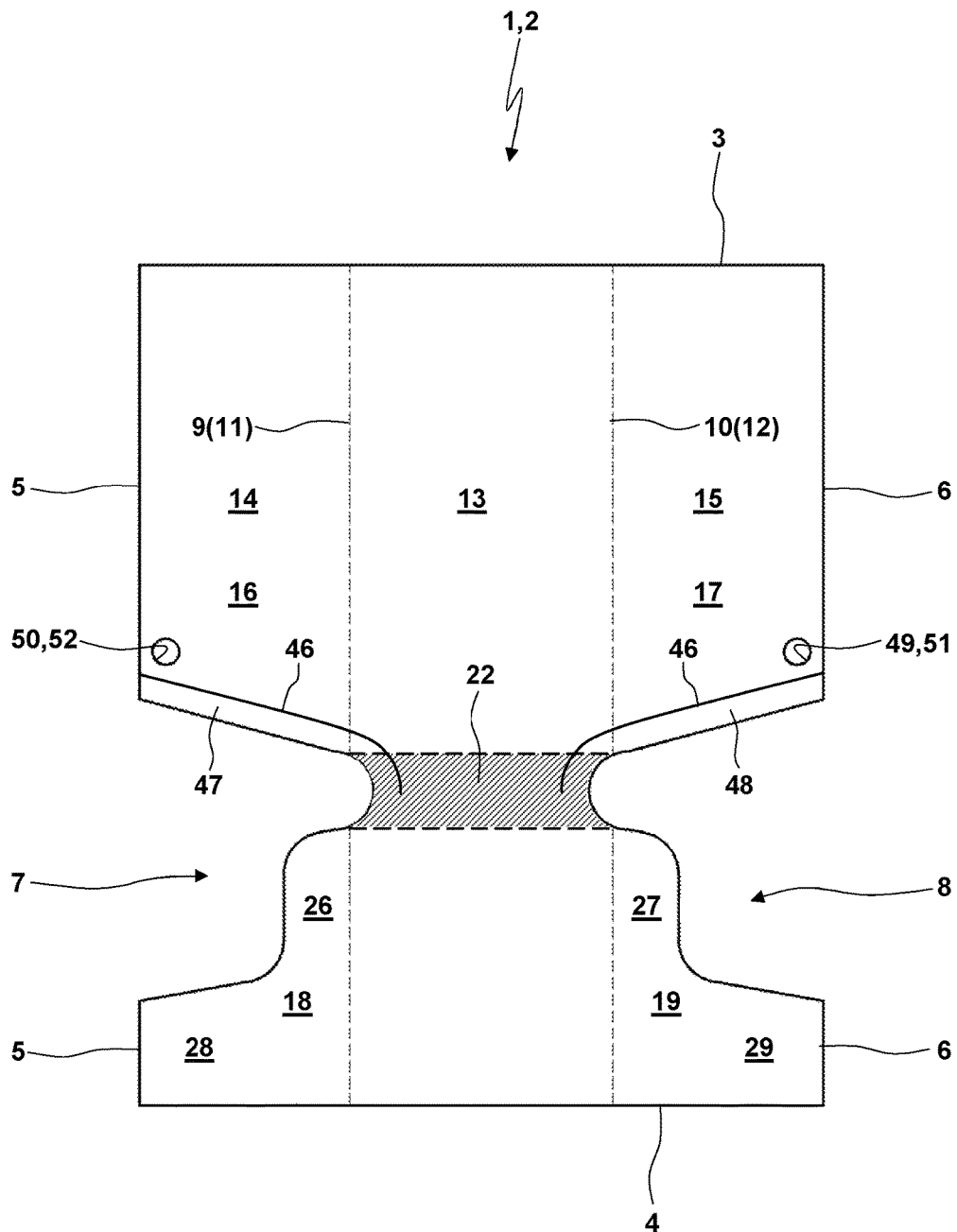
FIG. 6 shows a further embodiment of a material sheet for a vehicle seat protection cover.

For the embodiment shown in FIG. 6, the material sheet 1 of the vehicle seat protection cover 2 in the region of the upper side strips 16, 17 comprises incisions, punch-outs or perforations 46 by means of which elongated ties 47, 48 formed by the material sheet 1 are separated which extend from the insertion portion 22.

If the insertion portion 22 for this embodiment is inserted into the gap between seat cushion and backrest, the ties 47, 48 can be knotted with each other behind the vehicle seat. It is also possible that the material sheet 1 in its lower and laterally outer portion comprises openings 49, 50, especially eyelets 51, 52, with which the ties 47, 48 can be knotted.

Figure 7:
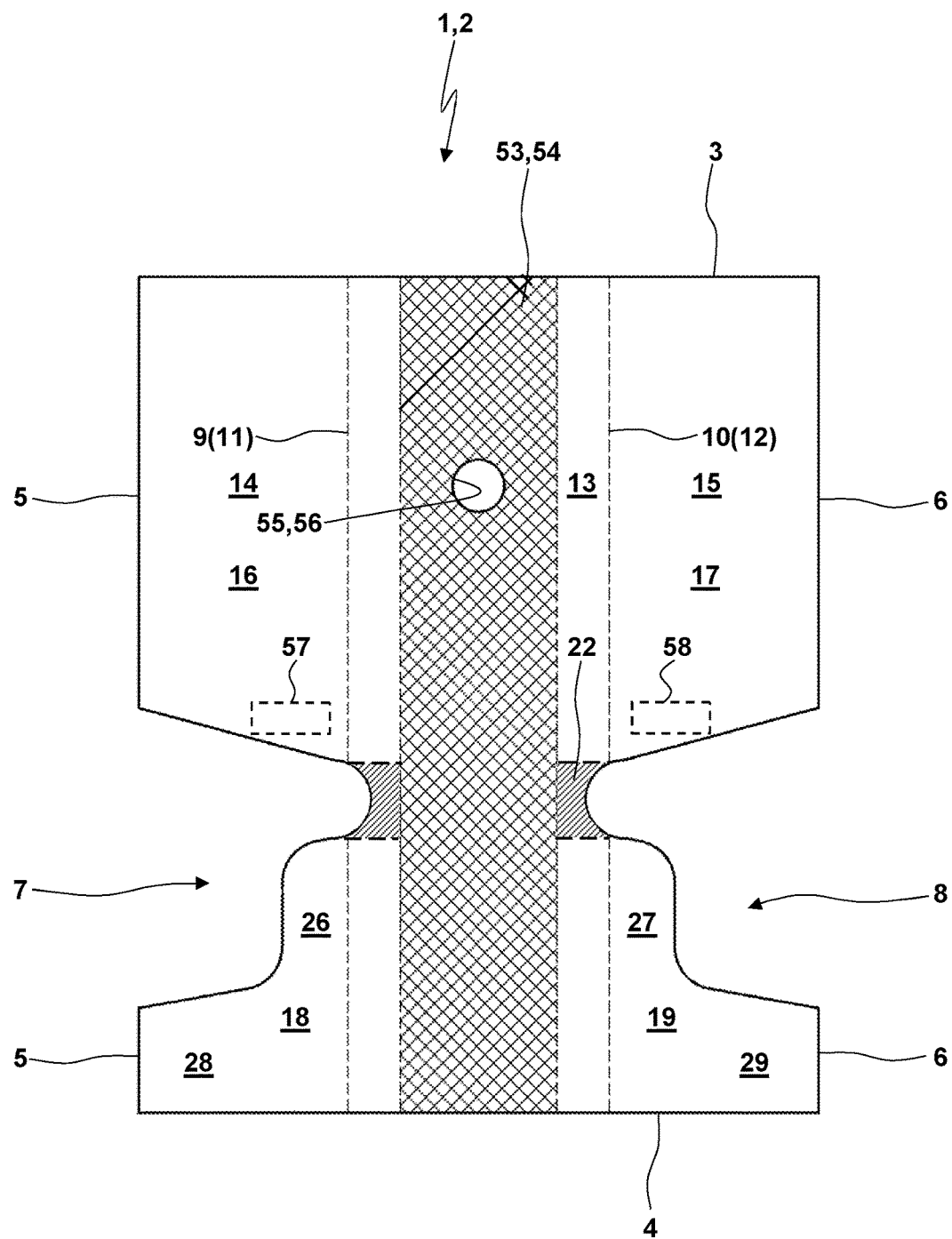
FIG. 7 shows a further embodiment of a material sheet for a vehicle seat protection cover.

FIG. 7 shows a further embodiment, in which the material sheet 1 is equipped with an additional layer 53, which here is shown as hatched. For the embodiment shown, the additional layer 53 is formed with a rectangular outer contour and extends over the entire longitudinal extension of the material sheet 1. The additional layer 53 is applied to the front layer 30 and has a lateral extension which is smaller than the lateral extension of the central portion 13 or the front layer 30. The additional layer 53 is arranged on the inside, that is, the side of the material sheet 1 turned towards the vehicle seat, and comprises a surface, a coating, a glue and/or a roughness in such a way that the adhesion of the material sheet 1 onto the vehicle seat is improved due to the additional layer 53. Preferably, the additional layer 53 is a plastic film 54. This plastic film 54 can have been applied to the material sheet 1 in any way and be connected to this material sheet 1. In this way, for example, the plastic film 54 can have been extruded onto the material sheet 1 or a separate plastic film 54 can be supplied and be connected to the material sheet 1 via calendering, gluing, laminating or similar.

As an optional feature, the material sheet 1 according to FIG. 7 comprises an opening 55 which here as a non-limiting example is arranged in the region of the front layer 30, especially in the region of the upper pocket 40. The opening 55 forms a viewing window 56, through which even when the material sheet 1 in itself is realized as opaque, the vehicle seat is visible through the vehicle seat protection cover 2. It is possible that the additional layer 53, especially the plastic film 54 that then is transparent, extends over the viewing window 56 so that in spite of the opening 55 the front layer 30 is realized as closed.

As a further optional feature, in FIG. 7 two additional layers 57, 58 are illustrated with dashed lines. If the vehicle seat protection cover 2 has been put over a vehicle seat and the insertion portion 22 extends onto the back side of the vehicle seat through the gap between the backrest and the seat cushion which then in any case is continuous, the portion of the insertion portion 22 protruding backwardly can be flipped upwards and connected to the additional layer 57, 58 which is realized as adhesive, in which way also a tightening of the vehicle seat protection cover 2 on the vehicle seat in the longitudinal direction can be induced.

Figure 8:
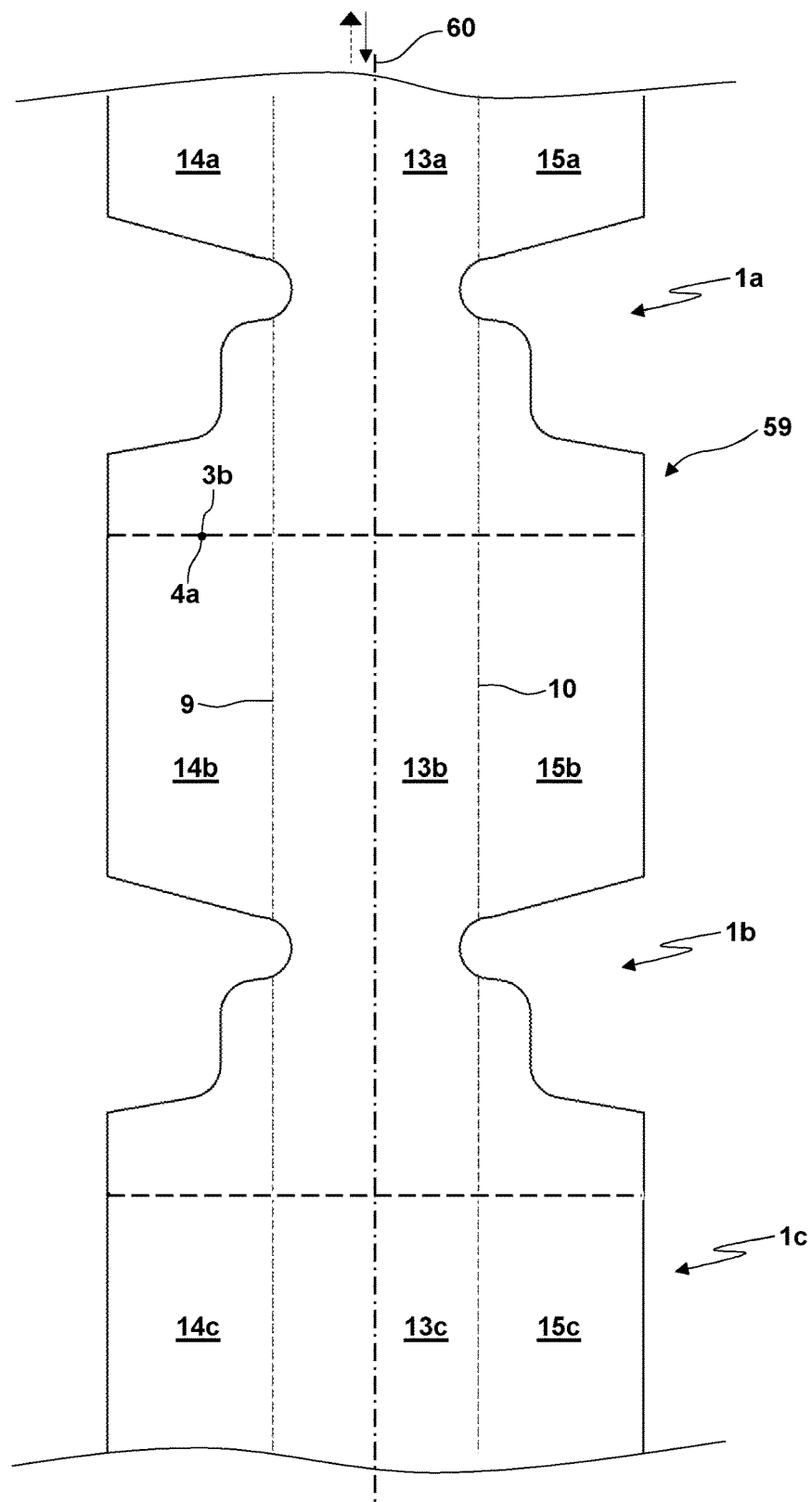
FIG. 8 shows a method step of the manufacture of vehicle seat protection covers with a semi-finished part with material sheets arranged one after the other and still connected to each other.

FIG. 8 shows a semi-finished part 59 for forming several material sheets 1a, 1b, 1c, . . . arranged directly neighboringly one after the other in the direction of the longitudinal axis of the semi-finished part 59 and a conveying direction in their manufacture. The letters a, b, c, . . . added to the reference signs mark corresponding construction elements of the different material sheets 1a, 1b, 1c, . . . and vehicle seat protection covers 2a, 2b, 2c, . . . . From the semi-finished part 59, vehicle seat protection covers 2a, 2b, 2c, . . . can be manufactured as follows:

The semi-finished part 59 is for example taken from a roll and conveyed continuously or intermittingly along a longitudinal axis 60 in one of the conveying directions indicated with arrows. The width of the semi-finished part 59 corresponds to the maximum lateral extension of the side edges 5, 6 of a material sheet 1, while the longitudinal extension of the semi-finished part 59 is a multiple of the longitudinal extension of a material sheet 1 for one vehicle seat protection cover 1.

In a subsequent method step, by punching or cutting the concave contours 7, 8 are produced.

Figure 9:
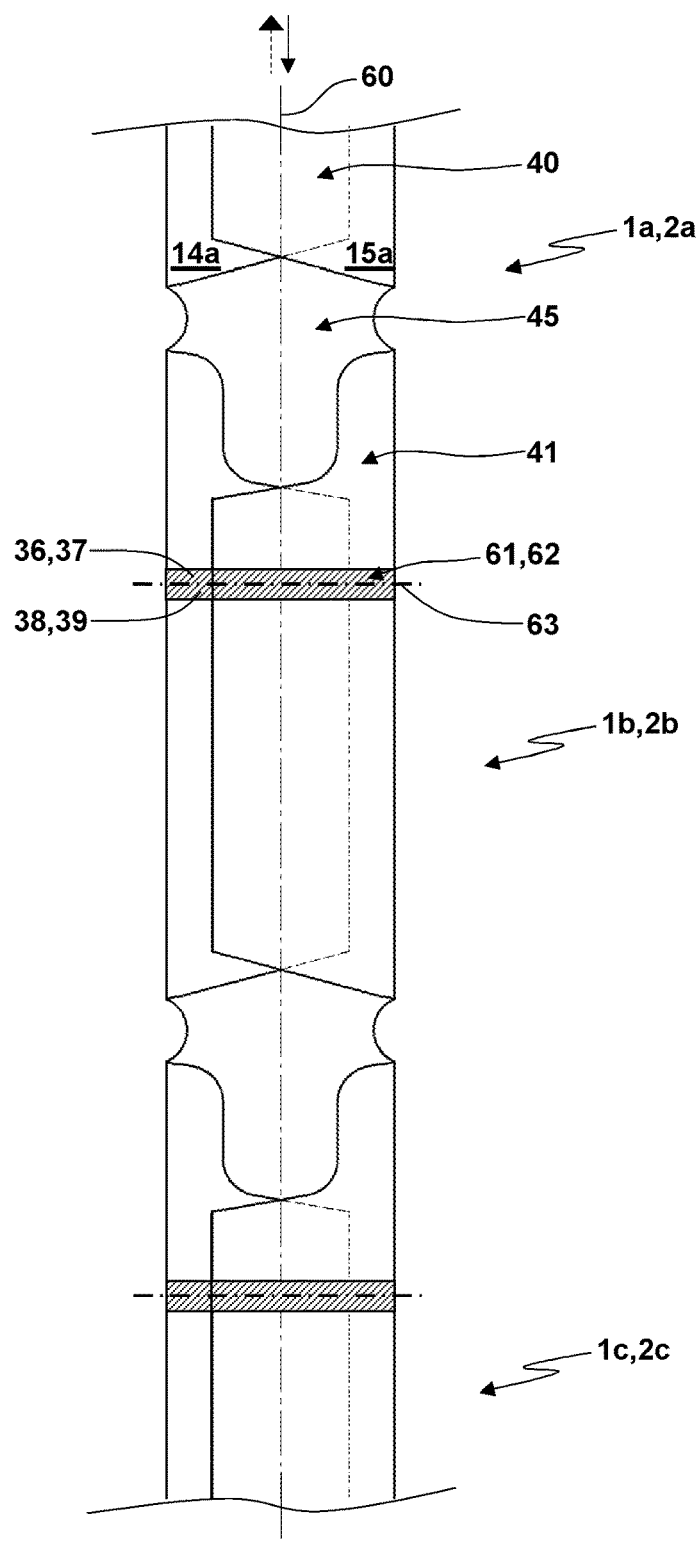
FIG. 9 shows another subsequent method step in the manufacture of vehicle seat protection covers with folded material sheets connected to each other via welding portions.

Subsequently, the folding of the side portions 14, 15 along the fold lines 9, 10 occurs, producing the folds 11, 12 (cp. FIG. 9).

In a next method step, in the transition region between the separate material sheets 1a, 1b, 1c which are still connected yet, connecting portions 61 or weld portions 62 are produced which extend over the entire width and comprise a certain longitudinal extension, especially an extension in the conveying direction 60 in the region of 0.5 cm to 4 cm, preferably in the region of 0.8 cm to 2 cm.

Subsequently, the connecting portions 61, 62 are separated by a separation oriented in the lateral direction or a perforation 63 which is applied centered to the extension of the connecting portions 61 or weld portions 62 in the conveying direction 60. The part of the connecting portion 61 arranged above the separation or a perforation 63 then forms the lower connection 38 of a vehicle seat protection cover 2a in the region of the lower edge 4, while the part of the connecting portion 61 remaining below the cut 63 then forms the upper connection 36 on the upper edge 3 of a neighboring vehicle seat protection cover 2b. Preferably, successively the concave contours 7, 8, the connecting portions 61 and the cut 63 are produced on a material sheet 1a, 1b, 1c, . . . .

According to the invention, especially a vehicle seat protection cover 2 is manufactured which mostly covers the upper side of the backrest, side areas of the backrest, side areas of the seat cushion and a front side of the seat cushion and in which the length of the cumulated connections 36, 38 or the overall length of the weld seams 37, 39 is less than 1,200 mm. As can be taken from FIGS. 8, 9, the conveying during the manufacture is done at an orientation of the material sheets 1a, 1b, 1c with their longitudinal axes and therefore the longitudinal axis of the vehicle seat protection cover 2 in parallel to the conveying direction 60. The lateral extension of the material sheet 1 then preferably is a maximum of 1,600 mm, where in a clocked operation an advancement according to the longitudinal extension of the material sheet 1 is done, preferably at less than 2,000 mm.

The weld seams 37, 39 are preferably induced by ultrasound welding, which can be achieved with a stopping of less than 1 s in the region of ultrasound welding jaws.

Many variations and modifications may be made to the preferred embodiments of the invention without departing substantially from the spirit and principles of the invention. All such modifications and variations are intended to be included herein within the scope of the present invention, as defined by the following claims.

I claim:

1. Vehicle seat protection cover comprising
   a) a front layer, which when the vehicle seat protection cover is put over a vehicle seat is arranged on a front side of the vehicle seat,
   b) a back layer, which when the vehicle seat protection cover is put over the vehicle seat is arranged on a back side of the vehicle seat,
   c) an upper pocket limited by the front layer and the back layer,
      ca) said upper pocket comprising an upper edge and side edges that are at least partially closed and
      cb) a cross section of the upper pocket being dimensioned such that when the vehicle seat protection cover is put over the vehicle seat the upper pocket accommodates at least one of a backrest and a headrest of the vehicle seat,
   d) a lower pocket limited by the front layer and the back layer,
      da) said lower pocket comprising a lower edge and side edges that are at least partially closed and
      db) a cross section of the lower pocket being dimensioned such that when the vehicle seat protection cover is put over a vehicle seat the lower pocket accommodates a seat cushion of the vehicle seat,
   e) the front layer and the back layer have been manufactured together from a one-piece folded material sheet and
   f) an opening of the back layer, said opening extending continuously from the at least partially closed lower edge to the at least partially closed upper edge, wherein due to the opening all of the cross sections of the vehicle seat protection cover between the at least partially closed lower edge and the at least partially closed upper edge are open such that also the upper pocket and the lower pocket have open cross sections.

2. The vehicle seat protection cover according to claim 1, wherein
   a) a central portion of the material sheet forms the front layer,
   b) side portions of the material sheet are folded in such a way that the side portions form the back layer and folds form the side edges of the upper pocket and the lower pocket,
   c) for forming the at least partially closed upper edge of the upper pocket, upper edges of the side portions of the material sheet are connected with the upper edge of the central portion of the material sheet via a connection,
   d) for forming the at least partially closed lower edge of the lower pocket, lower edges of the side portions of the material sheet are connected to the lower edge of the central portion of the material sheet via a connection,
   e) the opening of the back layer is limited by side edges of the material sheet.

3. The vehicle seat protection cover according to claim 2, wherein at least one of
   a) the connection of the lower edges of the side portions of the material sheet with the lower edge of the central portion of the material sheet or
   b) the connection of the upper edges of the side portions of the material sheet with the upper edge of the central portion of the material sheet
   is a weld seam.

4. The vehicle seat protection cover according to claim 3, wherein the weld seam directly adjoins the upper edge of the upper pocket or the lower edge of the lower pocket.

5. The vehicle seat protection cover according to claim 2, wherein the side edges of the side portions of the material sheet comprise concave contours.

6. The vehicle seat protection cover according to claim 5, wherein the concave contours of the side edges of the material sheet comprise a gap contour in which a width of the material sheet is smaller than a lateral distance of the folds of the material sheet and the gap contour separates an upper side strip of the side portion of the material sheet from a lower side strip of the side portion of the material sheet.

7. The vehicle seat protection cover according to claim 6, wherein
a) the upper side strip has a constant lateral extension and
b) the lower side strip
  ba) comprises a first lower side strip segment which extends upwards from the lower edge of the lower pocket, and
  bb) comprises a second lower side strip segment which in an upward direction follows the first lower side strip segment and comprises a smaller lateral extension than the first lower side strip segment.

8. The vehicle seat protection cover according to claim 2, wherein the side portions of the back layer comprise at least one overlap.

9. The vehicle seat protection cover according to claim 1, wherein the material sheet comprises an opening which forms a viewing window of the vehicle seat protection cover.

10. The vehicle seat protection cover according to claim 1, wherein the material sheet comprises an eyelet for a fixing means or tightening means.

11. The vehicle seat protection cover according to claim 1, wherein an additional layer has been applied onto a portion of the material sheet.

12. The vehicle seat protection cover according to claim 1, wherein in the region of the lower pocket the opening is U-shaped.

13. The vehicle seat protection cover according to claim 1, wherein the front layer comprises an insertion portion which when the vehicle seat protection cover is put over the vehicle seat is arranged in a gap between the backrest of the vehicle seat and the seat cushion of the vehicle seat.

14. The vehicle seat protection cover according to claim 1, wherein the material sheet consists of a non-woven material or a fleece.

15. The vehicle seat protection cover according to claim 14, wherein the material sheet of the non-woven material or fleece comprises a mass per unit area in the region of 12 g/m² to 60 g/m².

16. The vehicle seat protection cover according to claim 1, wherein the material sheet comprises an air permeability of at least 2000 mm/s.

17. The vehicle seat protection cover according to claim 15, wherein the material sheet comprises an air permeability of at least 2000 mm/s.

18. The vehicle seat protection cover according to claim 3, wherein a sum of all of the extensions of all weld seams between the front layer and the back layer of the vehicle seat protection cover is smaller than 1400 mm.

19. The vehicle seat protection cover according to claim 17, wherein a sum of the extensions of all weld seams between the front layer and the back layer of the vehicle seat protection cover is smaller than 1400 mm.

20. The vehicle seat protection cover according to claim 1, wherein the maximum lateral extension of the material sheet is not larger than 1600 mm.

21. The vehicle seat protection cover according to claim 19, wherein the maximum lateral extension of the material sheet is not larger than 1600 mm.

22. The vehicle seat protection cover according to claim 1, wherein the material sheet is realized as antistatic.

23. The vehicle seat protection cover according to claim 21, wherein the material sheet is realized as antistatic.

24. The vehicle seat protection cover according to claim 1, wherein the vehicle seat protection cover has a rectangular outer contour limited by side folds, an upper weld seam and a lower weld seam.

25. Method for manufacturing the vehicle seat protection cover according to claim 1, wherein
a) the material sheet is provided,
b) the side portions of the material sheet are folded in such a way that together the side portions form the back layer, a central portion of the material sheet forms the front layer and folds form the side edges of the upper pocket and the lower pocket,
c) the upper edges of the side portions of the material sheet are connected to the upper edge of the central portion of the material sheet, in which way the at least partially closed upper edge of the upper pocket is produced,
e) the lower edges of the side portions of the material sheet are connected to the lower edge of the central portion of the material sheet, in which way the at least partially closed lower edge of the lower pocket is produced.

26. The method according to claim 25, wherein a sheet-shaped semi-finished part is provided and from the sheet-shaped semi-finished part, via cuts or punchings the material sheet is manufactured.

27. The method according to claim 26, wherein via the cuts or punchings concave contours of the side edges of the material sheet are generated.

28. The method according to claim 26, wherein
a) a connecting portion between the side portions of the material sheet and the central portion is produced and
b) the connecting portion is parted by a transection or perforation
  ba) into a connection which connects the lower edges of the side portions of the material sheet to the lower edge of the central portion on a first vehicle seat protection cover, and
  bb) into a connection which connects the upper edges of the side portions of the neighboring material sheet to the upper edge of the central portion on a second neighboring vehicle seat protection cover.

29. Method for using of the vehicle seat protection cover according to claim 1, wherein
a) the upper pocket of the vehicle seat protection cover is slipped over a backrest of the vehicle seat and
b) the lower pocket of the vehicle seat protection cover is slipped over a seat cushion of the vehicle seat.

30. The method according to claim 29, wherein an insertion portion of the vehicle seat protection cover is inserted into a gap between the backrest of the vehicle seat and the seat cushion of the vehicle seat.

31. The method according to claim 30, wherein the insertion portion of the vehicle seat protection cover is secured in the gap between the backrest of the vehicle seat and the seat cushion of the vehicle seat.

* * * * *